(12) United States Patent
Watanabe et al.

(10) Patent No.: US 8,011,230 B2
(45) Date of Patent: Sep. 6, 2011

(54) SCANNING PROBE MICROSCOPE

(75) Inventors: Masahiro Watanabe, Yokohama (JP);
Toru Kurenuma, Tsuchiura (JP);
Hiroshi Kuroda, Kasumigaura (JP);
Takafumi Morimoto, Abiko (JP);
Shuichi Baba, Yokohama (JP);
Toshihiko Nakata, Hiratsuka (JP);
Manabu Edamura, Kasumigaura (JP);
Yukio Kembo, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 877 days.

(21) Appl. No.: 12/023,158

(22) Filed: Jan. 31, 2008

(65) Prior Publication Data
US 2008/0223122 A1    Sep. 18, 2008

(30) Foreign Application Priority Data
Mar. 13, 2007    (JP) ................. 2007-063021

(51) Int. Cl.
*G01B 5/28*    (2006.01)
(52) U.S. Cl. .................................. 73/105

(58) Field of Classification Search ............ None
See application file for complete search history.

(56) References Cited

U.S. PATENT DOCUMENTS
6,185,991 B1 *  2/2001  Hong et al. .................... 73/105

FOREIGN PATENT DOCUMENTS
| JP | 08-136552 | 5/1996 |
| JP | 2001-522045 | 11/2001 |
| WO | WO 99/23483 | 5/1999 |

* cited by examiner

*Primary Examiner* — Robert R Raevis
(74) *Attorney, Agent, or Firm* — Antonelli, Terry, Stout & Kraus, LLP.

(57) ABSTRACT

A scanning probe microscope, capable of performing shape measurement not affected by electrostatic charge distribution of a sample, which: monitors an electrostatic charge state by detecting a change in a flexure or vibrating state of a cantilever due to electrostatic charges in synchronization with scanning during measurement with relative scanning between the probe and the sample, and makes potential adjustment so as to cancel an influence of electrostatic charge distribution, thus preventing damage of the probe or the sample due to discharge and achieving reduction in measurement errors due to electrostatic charge distribution.

11 Claims, 13 Drawing Sheets $C=k/z$, $I=d/dt\ (CV) =-kV(dz/dt)/z^2$
VIBRATION INDUCTION DISPLACEMENT CURRENT ∝ DIFFERENCE IN POTENTIAL

SCAN REGION

SHAPE IMAGE

POTENTIAL MAP

SCANNING PROBE MICROSCOPE

The present application is based on and claims priority of Japanese patent application No. 2007-063021 flied on Mar. 13, 2007, the entire contents of which are hereby incorporated by reference.

BACKGROUND OF THE INVENTION

1. Field of the Invention

The present invention relates to a scanning probe microscope technology capable of shape measurement not affected by electrostatic charge distribution of a sample.

2. Description of the Related Art

As a measurement technology of a microscopic 3D shape, a scanning probe microscope (SPM) has been known. The SPM, employing a technology of scanning a sample while a cantilever having a pointed probe is being controlled and a contact force is being kept at a very small value, has been widely utilized as a technology capable of measuring a microscopic 3D shape of atomic order. However, because scanning is performed by detecting deformation or an oscillating state to/of a cantilever while a contact force is being measured between a probe and a sample, the following problem occurs if the sample is electrically charged: the charge influences deformation or vibration state of the cantilever, causing an error in a shape measurement result by SPM.

For example, National Publication of International Patent Application Publication No. 2001-522045 (Patent Document 1) describes an apparatus for measuring charge distribution of a sample. In addition, Japanese Patent Laid-Open Publication No. 8-136552 (Patent Document 2) describes an atomic force microscope with a voltage control unit for applying a voltage to a cantilever and/or a sample and a similar type of scanning probe microscope and discloses that an interaction such as an electrostatic force which becomes noise in measurements can be canceled by applying voltage at approach by a coarse motion between the cantilever and the sample.

As described above, conventional technologies have the following problem: an error occurs in a measurement result of SPM due to an influence of electrostatic charge of a sample. Moreover, an object of the invention of National Publication of International Patent Application Publication No. 2001-522045 (Patent Document 1) described above is to measure charge distribution without measuring the shape of a sample and has not disclosed a method for accurately measuring the shape of a sample by relieving an influence of electrostatic charges. On the other hand, the invention of Japanese Patent Laid-Open Publication No. 8-136552 (Patent Document 2) simply compensates for interaction such as an electrostatic force at approach by a coarse motion and cannot accurately measure the shape of a sample with charge distribution taken into consideration.

In view of such problems, it is an object of the present invention to provide a method for obtaining an accurate measurement result by SPM without influences of electrostatic charge distribution of the sample.

Moreover, it is another object of the present invention to prevent a sample or a probe from being damaged by discharge between the sample and the probe.

It is yet another object of the present invention to prevent a probe and a sample from being damaged by discharge between the probe and the sample by issuing an alarm and stopping scanning if voltage adjustment amount is in excess of an allowable value during scanning.

SUMMARY OF THE INVENTION

To solve such problems, during scanning for measurement by relative movement of a probe and a sample, the present invention detects a flexure or vibration state of a cantilever due to electrostatic charges in synchronization with the scanning and adjusts a potential of a conductive material brought into contact with the probe, a sample stage or the sample, thereby attaining reduction in measurement errors due to an influence of electrostatic charges.

In addition, the present invention detects a difference in the shape of flexure due to electrostatic charges of a cantilever during scanning a sample with a probe and adjusts a potential of a conductive material brought into contact with the probe, a sample stage or the sample, thereby attaining reduction in measurement errors due to an influence of electrostatic charges.

Furthermore, the present invention detects a change in a flexure or vibration state of a cantilever due to electrostatic charge, and performs the following operations if the detected change is in excess of an allowable value: stopping approach and issuing an alarm; waiting for completion of electrostatic charge removal by a neutralizer; and bringing a grounded conductive material into contact with a sample, thus preventing a probe and the sample from being damaged by discharge between the probe and the sample.

The present invention, during scanning for measurement by relative movement of a probe and a sample, adjusts a potential of a conductive material brought into contact with the probe, a sample stage or the sample, based on a flexure or vibration state of a cantilever due to electrostatic charges in synchronization with the scanning, thereby attaining reduction in measurement errors due to an influence of electrostatic charges.

In addition, the present invention, during scanning of a sample with a probe, adjusts a potential of a conductive material brought into contact with the probe, a sample stage or the sample, based on a difference in the shape of flexure due to electrostatic charges of a cantilever thereby attaining reduction in measurement errors due to an influence of electrostatic charges.

Furthermore, the present invention detects an electrically-charged condition by a change in a flexure or vibration state of a cantilever due to electrostatic charges to attain a function for taking steps for alarm, neutralization or the like, thus preventing the probe and the sample from being damaged due to discharge between the probe and the sample.

DETAILED DESCRIPTION OF THE PREFERRED EMBODIMENTS

Embodiments of the present invention will be more particularly described with reference to the accompanying drawings.

First Embodiment

Figure 1:
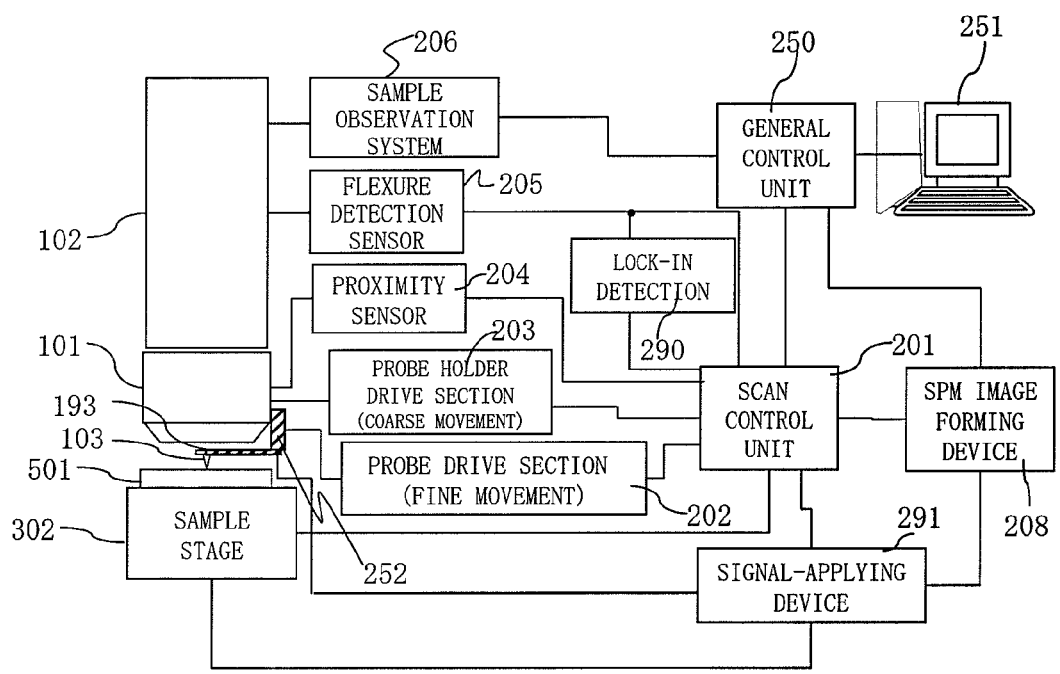
FIG. 1 is a view illustrating the whole configuration of a scanning probe microscope according to a first embodiment of the present invention.

FIG. 1 is a view illustrating a configuration of a scanning probe microscope according to the present invention. This scanning probe microscope has a sample 501 placed on a sample stage 302 capable of being driven in X, Y and Z directions and is controlled by a scan control unit 201. A probe 103 is positioned above the sample 501 and is formed on a distal end of a cantilever 193, and the cantilever 193 is attached to a probe traveling mechanism 252. The probe traveling mechanism 252 is driven in the X, Y and Z directions by control from a probe drive section 202, thus performing probe scanning with a scanning probe microscope. The probe traveling mechanism 252 is attached to a probe holder 101, and the probe holder 101 is attached to a lens-barrel 102 with a probe holder vertical movement 253 and is driven for coarse movement in the Z direction by control from a probe holder drive section 203.

The probe traveling mechanism 252, being an fine movement mechanism, does not have so large an operating distance. Accordingly, approach of the probe to a sample is performed by a probe holder vertical movement 253. Otherwise, as another embodiment, approach of the probe to a sample may be made by drive of sample stage 302 side. In addition, probe scanning of the scanning probe microscope may also be performed by drive of the sample stage 302 side. A proximity sensor (sample height sensor) 204 is a sensor for measuring a height of the sample in the vicinity of a tip of a probe with high sensitivity. This sensor previously detects a contact of a probe with a sample to control an approach speed, thus attaining a high-speed approach to a sample without hitting the probe against the sample. The proximity sensor 204 may use light as described below, however, other sensors may be used, provided that they have a detection range of at least tens of micrometers and can detect a distance between the probe and a sample with a sensitivity of approximately one micrometer. For example, a capacitance sensor which measures capacitance to detect a distance by applying AC voltage to between the sample holder 101 or the cantilever 193 and a sample 501, or an air micrometer which detects a pressure by flowing air in between a sample holder 101 and the sample 501 may be used.

A scan control unit 201 controls a sensor 205 for detecting a flexure of the cantilever 193, the proximity sensor 204, a probe holder drive section 203, a probe drive section 202 and a sample stage 302 to implement the approach of the probe and scanning of the sample. At this time, a signal obtained during the sample scanning is transmitted to an SPM image forming device 208 to obtain a surface shape image of the sample.

Moreover, a signal-applying device 207 vibrates the probe at high frequency and detects response with a flexure detection sensor 205 to measure elasticity of a surface and the like, or measures a current by applying AC or DC voltage to between the probe and the sample to measure capacitance or resistance. This operation is performed concurrently with probe scanning, thus obtaining a distribution image of additional properties besides a surface shape image in the SPM image forming device 207.

In the present invention, the signal-applying device 291 applies a bias voltage to the sample stage 302 or the probe 103, so that a difference in potential between the sample 501 and the probe 103 is adjusted to suppress an influence of electrostatic charges of the sample 501. In addition, by superimposing AC signals on bias voltage, the force applied to between the probe 103 and the sample 501 is modulated and by detecting vibration of the probe induced by the force, an electrically-charged condition can be measured.

When an objective lens is assembled into the probe holder 101, this type of apparatus can be applied to concurrent observation of an SPM measurement area and adjustment of the probe 103 at probe installation thereof.

Operation of the whole apparatus is controlled by a general control unit 250, so that a display/input unit 251 can receive an instruction of an operator and represent an optical image or an SPM image.

Figure 3:
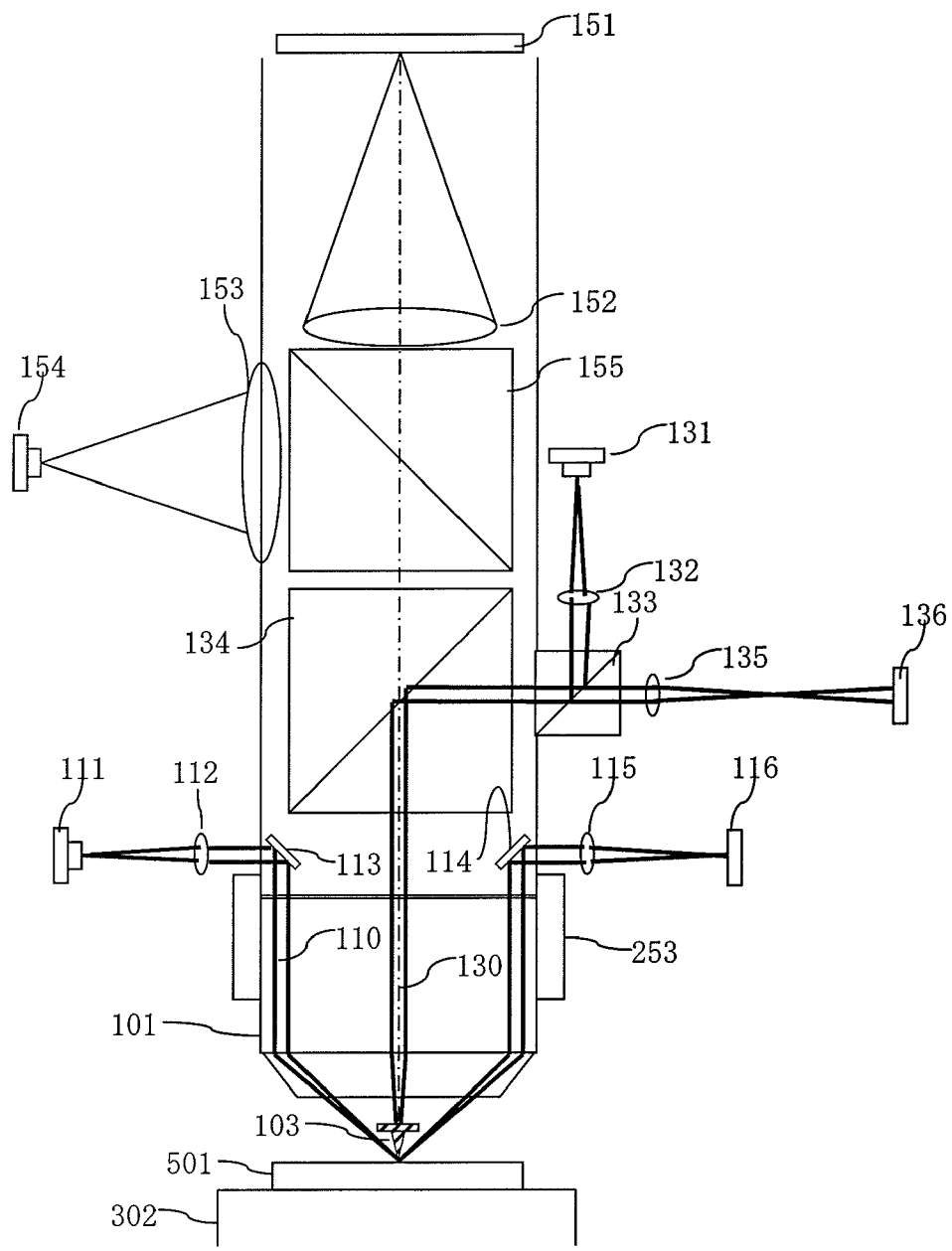
FIG. 3 is a view illustrating one embodiment of an optical system.

FIG. 3 is a view illustrating one embodiment of an optical system. The light emitted from a light source 111 is converted into parallel light by a lens 112, reflected by a mirror 113 and made incident into the objective lens formed inside the probe holder 101 to focus the light on the sample 501. An image of an arbitrary shape, such as a spot or a slit, can be formed, depending upon a shape of an aperture to be assembled into the light source 111. The light reflected on the sample, passing through the objective lens, is reflected by the mirror 114 and a tube lens 115 forms an image on a detector 116. A position of the image moves, depending upon a height of the sample 501. The traveling amount is $2mZ \tan \theta$, where $\theta$ is an incidence angle of detection light 110 into a sample, m is an imaging magnifying power of the lens 115 and Z is a height of a sample. Measurement of the traveling amount permits a height Z of a sample to be detected. Because it is sufficient for the detector 116 to detect a position of an image, as the detector, any of a PSD (position sensitive device), a divided photodiode, linear image sensor and the like may be used. Moreover, the above description has been made on a configuration of the detection light 110 passing through an objective lens, however, such a configuration that the detection light 110 passes through the outside of the objective lens and bent by another mirror (not illustrated) to form an image on the sample. At this time, the lens 112 and 115 are adjusted so that the light source 111 and the sensor 116 have an imaging relationship with the sample 501, respectively. The traveling amount of an image on the sensor 116 at this time becomes $2mZ \sin \theta$. The proximity sensor 204, using this relationship, processes an output of the detector 116 to output a sample height.

Next, description will be made on a flexure detection sensor 205 of the cantilever 193. The light emitted from the light source 131, passing through the lens 132 and then a beam splitter 134, passes the objective lens and is irradiated to the cantilever 193. The light reflected here returns along the same path, passes through a beam splitter 133 and is irradiated to a sensor 136 through the lens 135. The lens 135 is configured so that an exit pupil of the objective lens and the sensor 136 are in a conjugated position, thus generating a position change proportional to an inclination of a reflecting surface of the cantilever in the light on the sensor 136. This is detected by a PSD (position sensitive device) or a divided photodiode and a linear image sensor installed at a position of sensor 136, thereby detecting an inclination (flexure) of the cantilever. The flexure detection sensor 205, where a PSD or divided photodiode is used as a light detector, calculates a difference between outputs at both ends and performs conversion into a flexure amount by normalizing the difference by sum of the outputs. For use of a linear image sensor, a position of a laser spot is calculated from linear image data and converted to a flexure amount for outputting. In addition, use of 2D type PSD, an image sensor or quad-cell photodiode permits detection of torsion as well as flexure. To separate the detection light 130 from light for a sample observation system, preferably, single-color laser is used as the light source 131 and an interference filter is provided before or behind the lens 135 so that light form the light source 131 only passes through the filter.

For further high efficiency, a dichroic mirror may be used in place of the beam splitter 134. With a polarizing beam splitter used as the beam splitter 133 it can be configured as follows: the light source 131 is arranged in a direction so as the light from the light source is reflected as a S-polarized beam by the splitter 133 and a quarter wave plate (not illustrated) is placed between the beam splitters 133 and 134, by which the S polarization is converted to circular polarization which is applied to the reflecting surface of the cantilever 193 and the reflecting light is converted to P polarization, by the quarter wave plate, to pass the light through the polarizing beam splitter 133.

A sample observation system 206 is structured so that the following operations are performed: Light is emitted from an illumination light source 154, passes through a condenser lens 153, reflects on a beam splitter 155 and passes through the beam splitter 134 and then the objective lens in the probe holder 101 to illuminate the sample 501. The reflecting light of the sample, passing through the objective lens again, passes through the beam splitters 134 and 155 to form an image with a tube lens 152, which is detected by an image sensor 151 and converted into digital image data.

Figure 2:
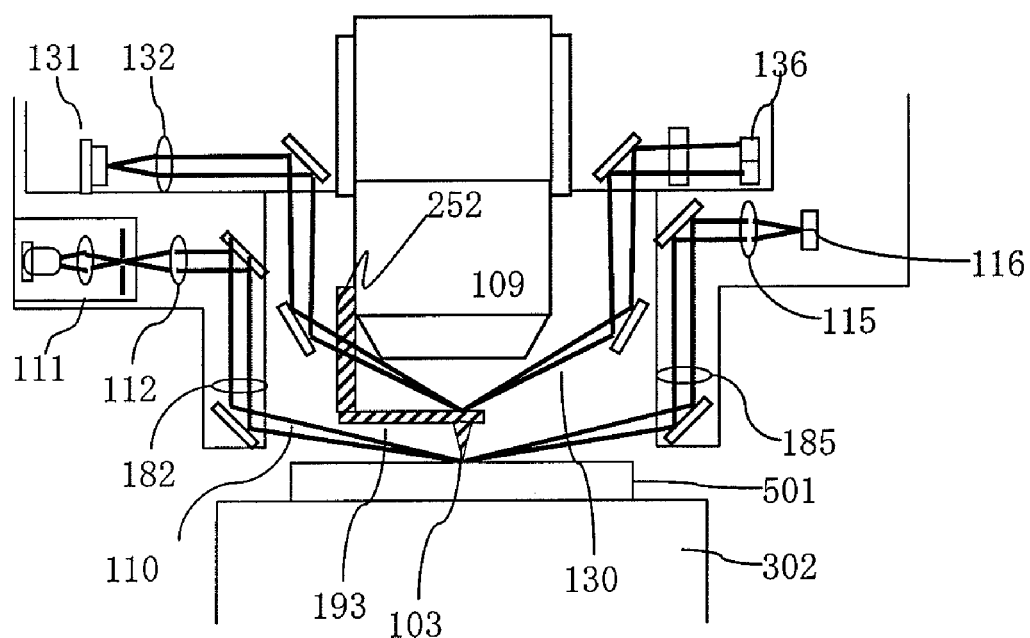
FIG. 2 is an enlarged view of one embodiment around a probe.

As described above using FIG. 3, an optical system comprising the probe 501, the sample observation system 206, the proximity sensor (sample height sensor) 204, the flexure detection sensor 205 for cantilever flexure detection is coaxially formed, thus attaining observation of the SPM measurement area simultaneously by the sample observation system 206 with SPM, easy adjustment of the cantilever 193 and high-speed approach of the probe 103 to the sample 501. Coaxial formation of an optical system of the cantilever flexure detection sensor 205 with the cantilever 193 can irradiate the detection light 130 even on a cantilever 193 of a small width, and further attain high-speed scanning using a lighter cantilever of a high resonance frequency. Detection of all through the objective lens 101 can bring the objective lens into close proximity to the cantilever, thus attaining optical observation of the sample with high resolution. As a matter of course, one embodiment will be proposed in which at least either of the proximity sensor (sample height sensor) 204 or the cantilever flexure sensor has an off-axis configuration for projecting and detecting light from an oblique direction through a clearance between the objective lens and the sample. Referring now to FIG. 2, this embodiment will be described below.

Further, as another configuration, a device, such as a strain gauge, that produces a signal reflecting a change in distortion, being built into the cantilever 193, may be used in place of the optical flexure sensor 205. As still another configuration, a position or a vibrating state of the tip of the cantilever 193 may be detected from the reflecting light obtained by irradiating laser to the cantilever 193 and a signal obtained by interference with a reference laser.

FIG. 2 is a view illustrating another embodiment of an optical system. The light emitted from the light source 111 is changed to parallel light by the lens 112, reflected on the mirror 113 and is made incident into the lens 182 through reflection on the mirror to form a focus on the sample 501. An image of an arbitrary shape, such as a spot or a slit, can be formed, depending upon a shape of an aperture to be assembled into the light source 111. The light reflected on the sample passes through the lens 185 via reflection on a mirror and the tube lens 115 forms an image on the detector 116. A position of the image moves, depending upon the height of the sample 501. The traveling amount is $2mZ \tan \theta$, where $\theta$ is an incidence angle of detection light 110 into a sample, m is an imaging magnifying power of the lens 115 and Z is a height of a sample. Measurement of the traveling amount permits a height Z of a sample to be detected. Because it is sufficient for the detector 116 to detect a position of an image, as the detector, any of a PSD (position sensitive device), a divided photodiode and a linear image sensor and the like may be used.

Next, description will be made on the flexure detection sensor 205 of the cantilever 193 according to the embodiment in FIG. 2. The light emitted from the light source 131 passes through the lens 132 and is irradiated to the cantilever 193 through reflection on the mirror. The light reflected on the mirror is irradiated to the sensor 136. The flexure of the cantilever 103 changes an angle of reflecting light, so that a change in the position proportional to an inclination of a reflecting surface of the cantilever is generated in the light on the sensor 136. This is detected by PSD (position sensitive device), a divided photodiode and a linear image sensor installed at a position of sensor 136, thereby detecting an inclination (flexure) of the cantilever. In addition, use of 2D type PSD, an image sensor or quad-cell photodiode permits detection of torsion as well as flexure. To separate the detection light 130 from light for a sample observation system, preferably, a single-color laser is chosen as the light source 131 and an interference filter is provided before or behind the detector 136 so that the light from the light source 131 only passes through the interference filter. A reference character 109 denotes an objective lens of the sample observation system.

Figure 4A:
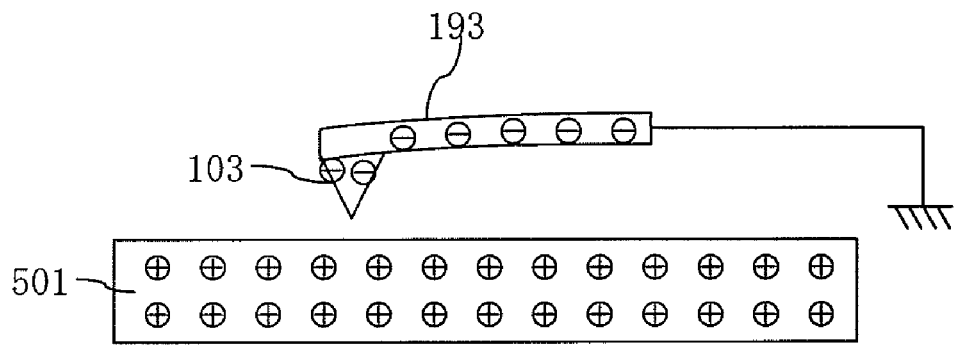
FIG. 4 is a view illustrating an influence of electrostatic charges of a sample and an effect of potential adjustment.

Referring now to FIG. 4, description will be made on an influence of electrostatic charges. As illustrated in FIG. 4A, the cantilever 193 faces the sample 501. The probe 103 is formed at the distal end of the cantilever 193. The cantilever 193 is a conductor and grounded to a ground as in FIG. 4. For example, when positively charged, the cantilever 193 receives electrostatic induction and electrons flow into from a ground line for negative charges. As a result, different types of charges face each other, consequently the cantilever 193 receives attraction force on the sample 501 side to have a flexure. SPM precisely controls a base of the cantilever 193 for measurement of a sample height distribution. Accordingly, the presence of electrostatic charges would cause the measurement height of the sample to have errors by an amount corresponding to flexure due to electrostatic charges. When electrostatic charges are severe, the cantilever 193 have a large flexure, consequently measurement light for flexure detection does not reach the detector 136, or discharge occurs between the probe 103 and the sample 501, which damages the probe 103 or the sample 501.

It is known that an attraction by electrostatic induction is proportional to the square of V and almost inversely proportional to the square of d, where V is a difference in potential between two bodies and d is a distance between the two bodies. Therefore, it is understood that if electrostatic charges are rich, or V is large, an influence will rapidly become large.

As a conventional technology, a surface potential distribution measurement apparatus called Kelvin Force Microscope is known. For example, National Publication of International Patent Application Publication No. 2001-522045 discloses that superimposing of an AC voltage by an oscillator on the cantilever allows the cantilever to receive an attraction force in a sample direction proportional to the square of a difference in potential V. Accordingly, if a difference in potential is not zero, there occurs a relationship between a superimposed voltage and an attraction force that each thereof monotonous increases or decreases, depending upon positive or negative difference in potential. When the difference in potential is smaller than the amplitude of the superimposed voltage, there exists points having attraction which is large at both terminals and zero in the middle of the superimposed voltage. Accordingly, if a frequency of the superimposed voltage is f, a flexure of the cantilever changes at a frequency f in the presence of a difference in potential. In the absence of a difference in potential, a flexure changes at a frequency 2f. Accordingly, when a flexure signal of the cantilever is detected and further detection by a lock-in detection means is performed, based on a superimposed voltage signal, an output signal thereof changes proportionally to positive or negative difference in potential and, if the difference in potential is zero, a lock-in detection output also becomes zero. If an output signal of the synchronous detector is fed back into a voltage bias of the cantilever, balancing is made when a potential of the sample is equal to that of the cantilever, thus measuring the potential of the sample as a potential of the balanced cantilever.

Figure 4B:
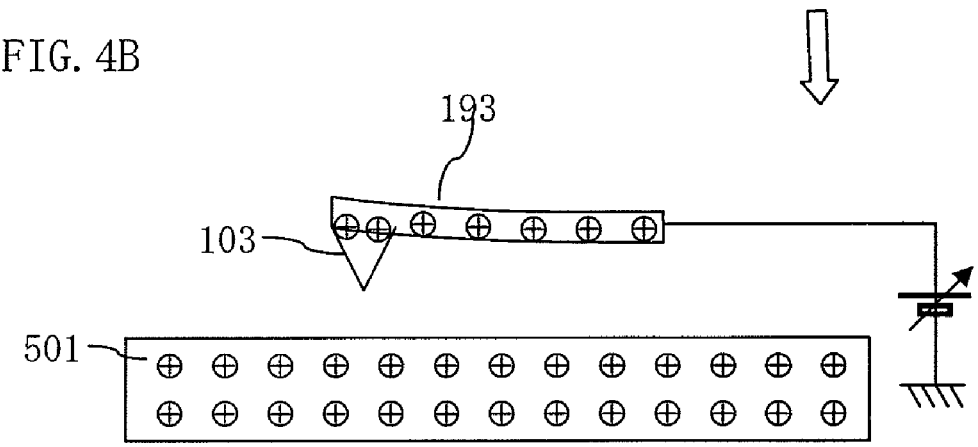

However, the conventional technology described above has the following problems: FIG. 4B illustrates a state in which the same potential as the sample 501 is made by applying a bias voltage to the cantilever 193 in FIG. 4A. In this case, the same type of charges repel one another, so that the cantilever 193 has a flexure in such a direction as to separate from the sample 501. Accordingly, the conventional technology can exactly measure a potential of the sample 501, however, electrostatic force applied to the cantilever 193 causes the following problem: an error occurs in a shape to be measured.

Figure 4C:
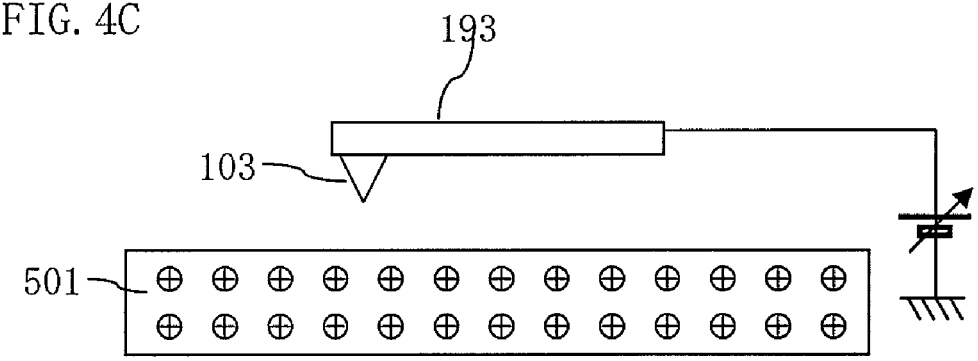

As illustrated in FIG. 4C, if a bias voltage of the cantilever 193 is set to an appropriate value midway between a potential of the sample 501 and a ground potential, charges in the cantilever 193 are neutralized and an influence of electrostatic charges of the sample 501 can be eliminated. In other words, an attraction force by electrostatic induction and a repulsion by the same type of charges are in a balanced condition. In this case, a bias potential is equal to a potential which an electric field by electrostatic charges of the sample 501 generates at a position of the cantilever 193 in the absence of the cantilever 193.

The present invention, as described later, does not make a potential of the cantilever 193 equal to that of the sample 501 as seen in a state of (b), but can reduce the flexure of the cantilever 193 by the electrostatic charges of the sample 501 as seen in a state of (c).

Figure 5:
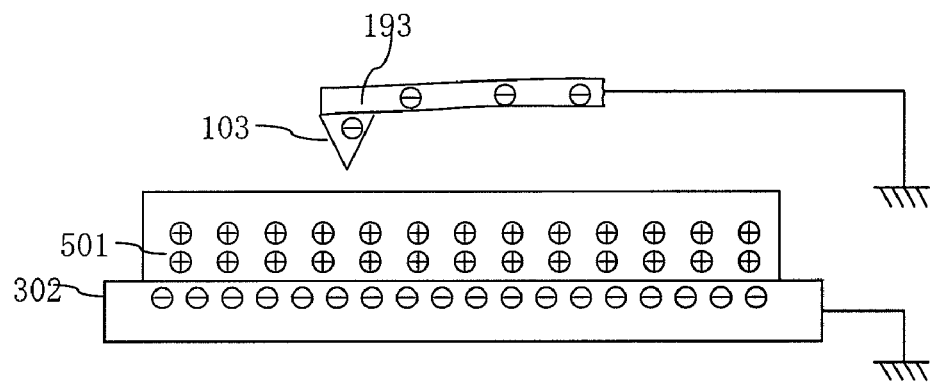
FIG. 5 is a view illustrating an effect of a grounded sample stage.

Referring next to FIG. 5, a phenomenon in which the sample 501 is placed on the conductive grounded sample stage 302 will be described. In this case, negative induced charges flow into the sample stage 302 from the ground line and an electric field caused thereby acts in such a direction as to reduce the electric field by electrostatic charges of the sample 501, so that negative charges induced to the cantilever 193 decrease, thus reducing a flexure of the cantilever 193 due to the negative charges.

Figure 6:
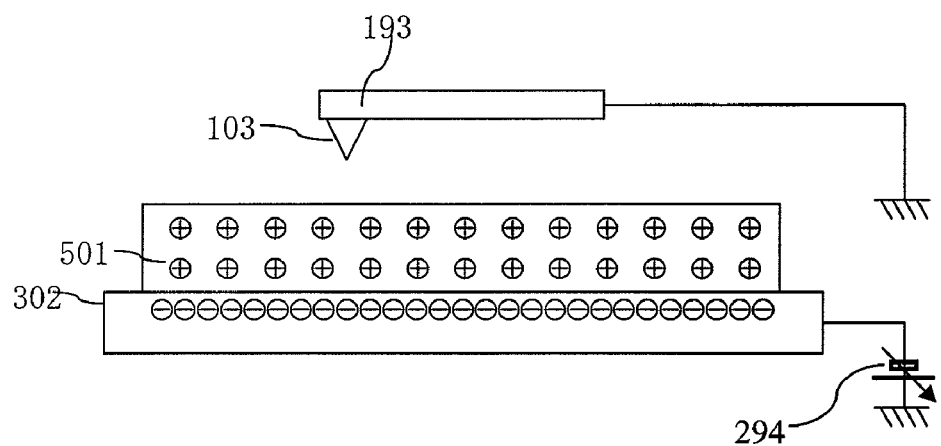
FIG. 6 is a view illustrating an effect of potential adjustment of a sample stage.

Further, as illustrated in FIG. 6, when a potential of the sample stage 302 is adjusted and a voltage is applied so as to offset an electric field above the sample 501, no induced charges are generated in the cantilever and the flexure can be eliminated.

Figure 7:
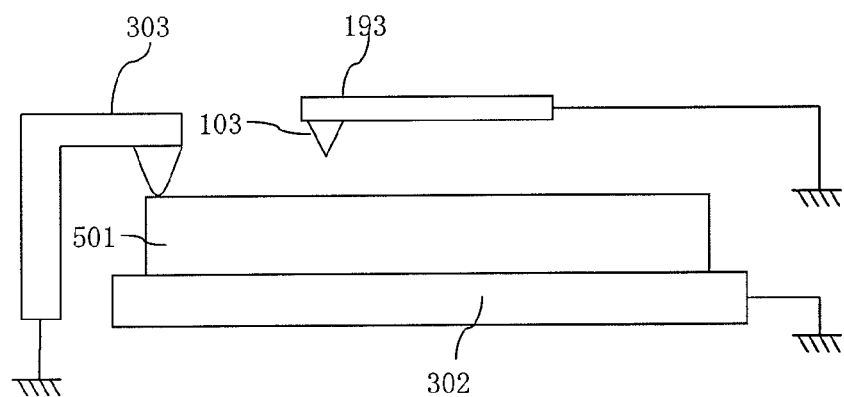
FIG. 7 is a view illustrating an effect of a grounded sample.

In FIG. 7, the sample 501 is not a dielectric, but a conductor covered with thin film. In this case, as another embodiment, when a ground needle 303 is pressed against the sample 501, the thin film is broken and the sample 501 is grounded to relieve charges, thus eliminating an influence of electrostatic charges.

Second Embodiment

Figure 8:
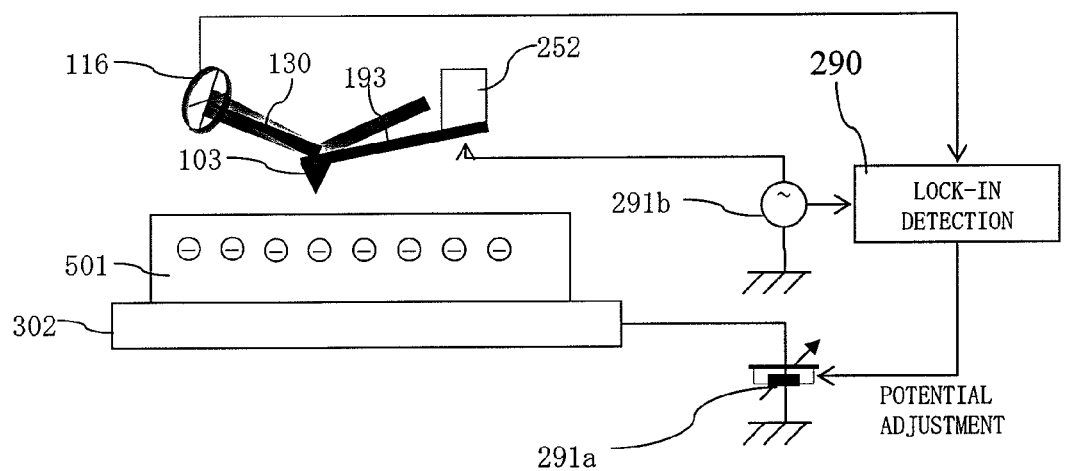
FIG. 8 is a view illustrating potential adjustment of a sample stage according to a second embodiment of the present invention.

FIG. 8 illustrates an embodiment of electrostatic charge detection according to the present invention in the event that the sample 501 cannot be grounded. When an AC voltage is applied into the cantilever 193 with an oscillator 291b, the cantilever 193 receives an attraction force in the direction of the sample 501 proportional to the square of a potential V of the sample 501. Accordingly, if a difference in potential is not zero, there occurs a relationship between a superimposed voltage and an attraction force that each thereof monotonously increases or decreases, depending upon positive or negative difference in potential. With V smaller than the amplitude of a superimposed voltage, there exists points having an attraction force which is large at both terminals or zero in the middle of the superimposed voltage. Accordingly, if a frequency of the superimposed voltage is f, a flexure of the cantilever changes at a frequency f when V is not next to zero. When V is next to zero, a flexure changes at a frequency 2f.

Accordingly, when a flexure signal of the cantilever is detected by the detector 116 and further detection by a synchronous detection (lock-in detection) means 290 is performed, based on a superimposed voltage signal, an output signal thereof changes proportionally to positive or negative difference in potential and, if the difference in potential is zero, a lock-in detection output also becomes zero. If an output signal of the synchronous detector is fed back into a voltage bias circuit 291a for the sample stage 302, balancing is made when a surface potential of the sample 501 is equal to that of the cantilever 193 or when the surface potential of the sample 501 becomes zero.

In this case, the bias potential of the sample stage 302 is not equal to a surface potential of the sample 501 and permits measurement of a distribution of the surface potential of the sample 501 offset by an amount corresponding to a difference in potential by an electric field generated in the sample 501. In this state, the electrostatic force acting on the cantilever 193 becomes zero. Accordingly, SPM can be provided which exactly measures a surface shape of the sample 501 with the probe 103 without influences of electrostatic charges of the sample 501.

Third Embodiment

Figure 9:
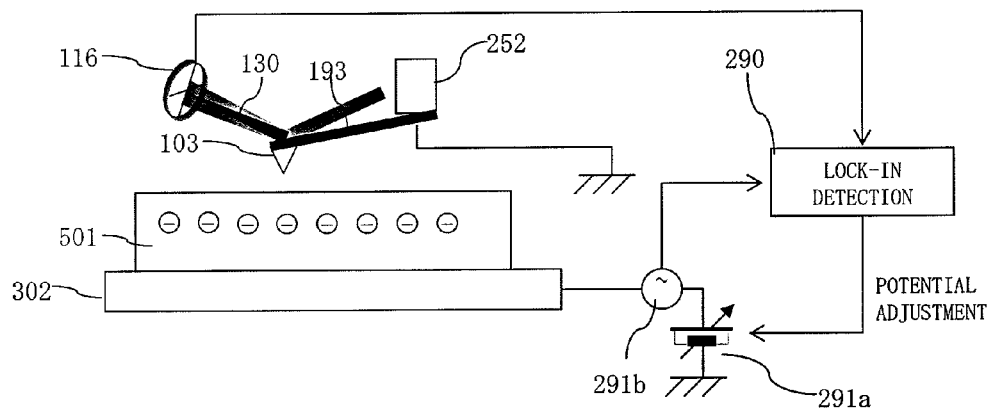
FIG. 9 is a view illustrating potential adjustment of a sample stage according to a third embodiment of the present invention.

FIG. 9 is another embodiment of FIG. 8. A cantilever 193 is grounded and an AC voltage of an oscillator 291b is superimposed on the bias voltage 291a and is applied into a sample stage 302. The operations of other portions are the same as in FIG. 8, except only one difference between applications of an AC voltage to the sample stage 302 side and to the cantilever 193 side. The electrostatic force by induced charges is the same as for the embodiment in FIG. 8 except that a phase of a change relative to superimposed voltage is inverted by 180 degrees. Accordingly, this configuration can provide SPM which accurately measures a surface shape of the sample 501 with the probe 103 without influences of electrostatic charges of the sample 501.

Figure 10:
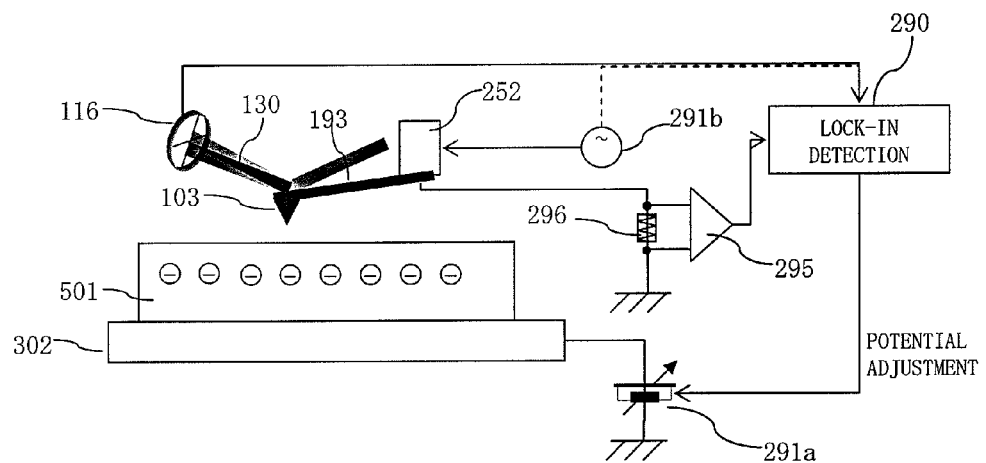
FIG. 10 is a view illustrating another embodiment of potential adjustment of a sample stage according to the present invention.

FIG. 10 illustrates an embodiment of adjusting a bias potential V of the sample stage 302 by detecting a change in capacitance between the cantilever 193 and the sample 501 by vibration of the cantilever 193. The capacitance is expressed by $C=k/z$, where z is a distance between the cantilever 193 and the sample 501 and k is a proportional constant. When the cantilever 193 vibrates, capacitance changes. Accordingly, a displacement current I goes into/out of the cantilever 193. Taking (d/dt) as a time differentiation symbol, $I=(d/dt)(CV)=-KV(dz/dt)/(\text{square of } z)$, where V is a difference in potential between cantilever 193 and sample 501. Accordingly, a vibration-induced displacement current is proportional to a difference in potential V. Consequently, when a displacement current is subjected to lock-in detection with a vibration signal, an output proportional to a difference in potential is obtained. Feeding back this into the bias 291a permits influences of electrostatic charges of the sample 501 to be cancelled.

Referring now to FIG. 10, operations will be described. An AC signal of the oscillator 291b is added to the cantilever traveling mechanism 252 to vibrate the probe 103. The AC signal is not added to the probe traveling mechanism 252 itself, but a dedicated piezoelectric element for vibration may be sandwiched between the probe traveling mechanism 252 and the cantilever 193 and the AC signal may be applied to the piezoelectric element instead. A piezoelectric element may be coated with thin film and an AC signal may be applied to the cantilever 193 itself. Further, the cantilever may be irradiated with laser beam to modulate the strength, thus generating photothermally-exited vibration. The displacement current flowed by vibration of the cantilever 193 excited thereby is detected by a resistor 296 and an amplifier 295 and a cantilever flexure signal detected by a photodiode 116 is subjected to lock-in detection (290) and is used for potential adjustment of the sample stage 302 as described above. Otherwise, a reference signal of lock-in detection may be a vibrating signal itself by 291b.

Fourth Embodiment

The potential adjustment described above is necessary to be made in such a state that the probe separates from the sample. A sequence for making the potential adjustment will be described below.

Figure 11:
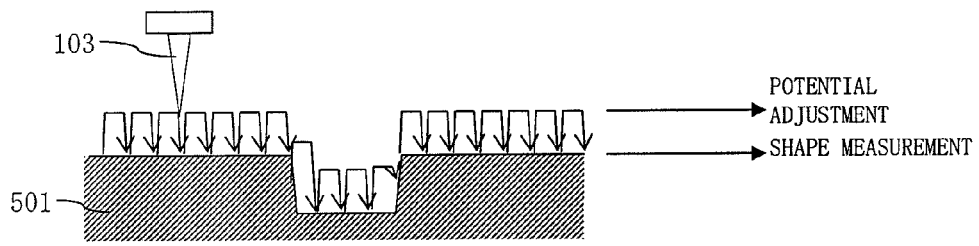
FIG. 11 is a view illustrating a path of a probe without potential adjustment.
Figure 12:
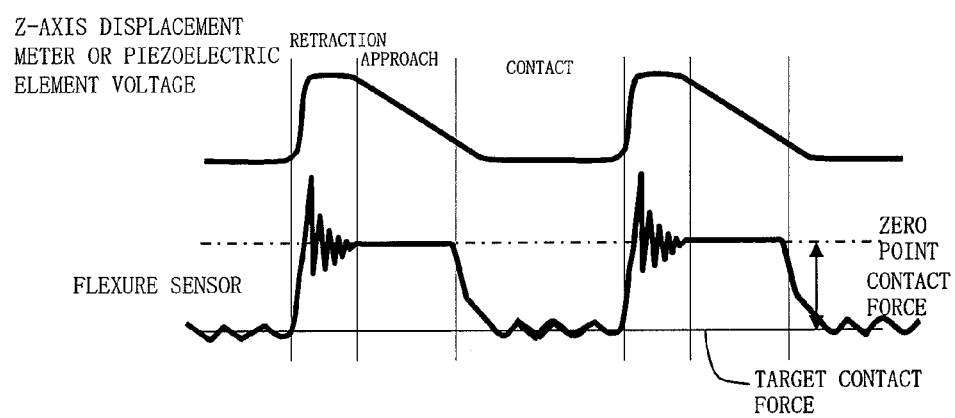
FIG. 12 is a view illustrating time changes of signals of a flexure sensor and a height sensor without potential adjustment.

FIG. 11 is a view describing a path of a probe in a scan mode suitable for highly precise measurement of a high-aspect ratio sample. FIG. 12 illustrates a state of a signal made at this time. An upper waveform is a signal showing a height of the cantilever and is an applied voltage of a Z-axis piezoelectric element of the probe traveling mechanism 252 or an output signal of a Z-axis displacement meter assembled into the probe traveling mechanism 252. A lower waveform is an output signal waveform of the flexure sensor 205, and the downward waveform illustrates such a state that the probe 103 is pressed against the sample 501 and the waveform higher than a long dashed short dashed line illustrates such a state that the probe 103 is made to adhere to the sample 501. The adhesion results from van der Waals force or surface tension by water content in the atmosphere.

In FIG. 11, the probe 103 separates from a sample 501 once after measurement at respective measurement points and, under this state, moves to an adjacent measurement point. Then the probe 103 and the sample 501 are brought near each other again to contact each other again and, when a fixed contact state is reached, a height of the probe traveling mechanism 252 is recorded to measure heights of the sample at the respective points. In this measurement method, horizontal movement is performed in such a state that the probe is separated from the sample without dragging. This provides the following merit: a 3D shape can be accurately measured even at a steep inclination portion without any horizontal force being applied to the probe. This measurement method is disclosed in Japanese Patent Laid-Open Publication No. 2004-125540.

A contact force signal, when the probe contacts the sample, permits a root height of the cantilever to be controlled to obtain a fixed target contact force, as illustrated in FIG. 12. After the height is measured, the probe is retracted once for measurement of the next point. A flexure sensor signal is an attraction force acting on between the probe and the sample. Accordingly, escape from adhesion after a positive direction is made once brings returning to a zero point after residual vibration appears at a flexure signal. Once the probe starts approach again, the signal of the flexure sensor changes in a negative direction again upon a contact between the probe and the sample, and a Z-axis height of the probe traveling mechanism 252 is controlled so as to meet a target contact force.

In this measurement method, at any timing of a period of movement to an adjacent measurement point, completion of separation thereof and a period from a second approach start to an approach to a fixed distance, potential adjustment is made as one embodiment of the present invention because of no contact between the probe and the sample.

This permits a microscopic 3D shape of the sample to be measured with high precision while a potential of the sample stage or the probe being always adjusted so as to have no influences of electrostatic charges of the sample. Moreover, measurement of a surface potential distribution of the sample in addition to a 3D shape can be made. Further, when adjustment result indicates that a potential is higher than a predetermined value, such measures as to issue an alarm, stop measurement or operate a neutralizer can be automatically or manually taken.

Figure 13:
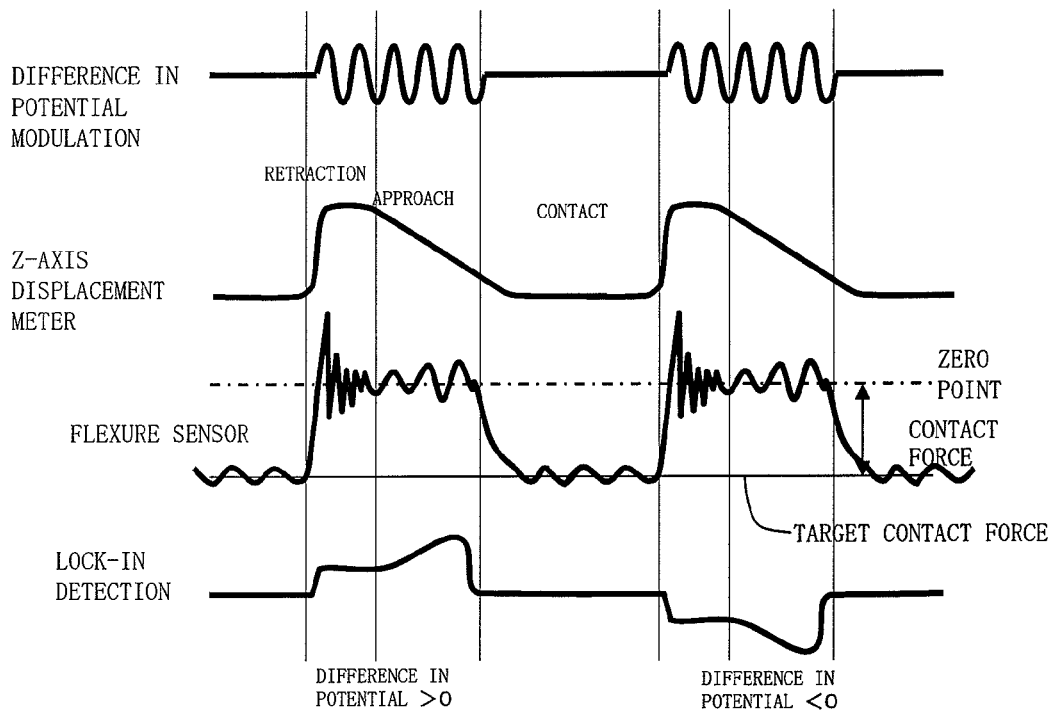
FIG. 13 is a view illustrating signal waveforms of embodiment by potential difference modulation between a probe and a sample of potential adjustment of a sample stage according to a fourth embodiment of the present invention.

Referring now to FIG. 13, detailed description will be made on a signal at potential adjustment according to the present invention. During a period in which the probe 103 separates from the sample 501 and an output of the flexure sensor 205 becomes almost zero, an AC voltage is applied into the probe 103 or the sample stage 302. A detection result of the vibration given to the cantilever 193, which is detected by the flexure sensor 205 and the synchronous detection (lock-in) circuit 290, is a signal at the lowest stage of FIG. 13. A sign of the signal indicates a direction of potential adjustment. Using this, a potential of the probe 103 or the sample stage 302 is adjusted.

Figure 14:
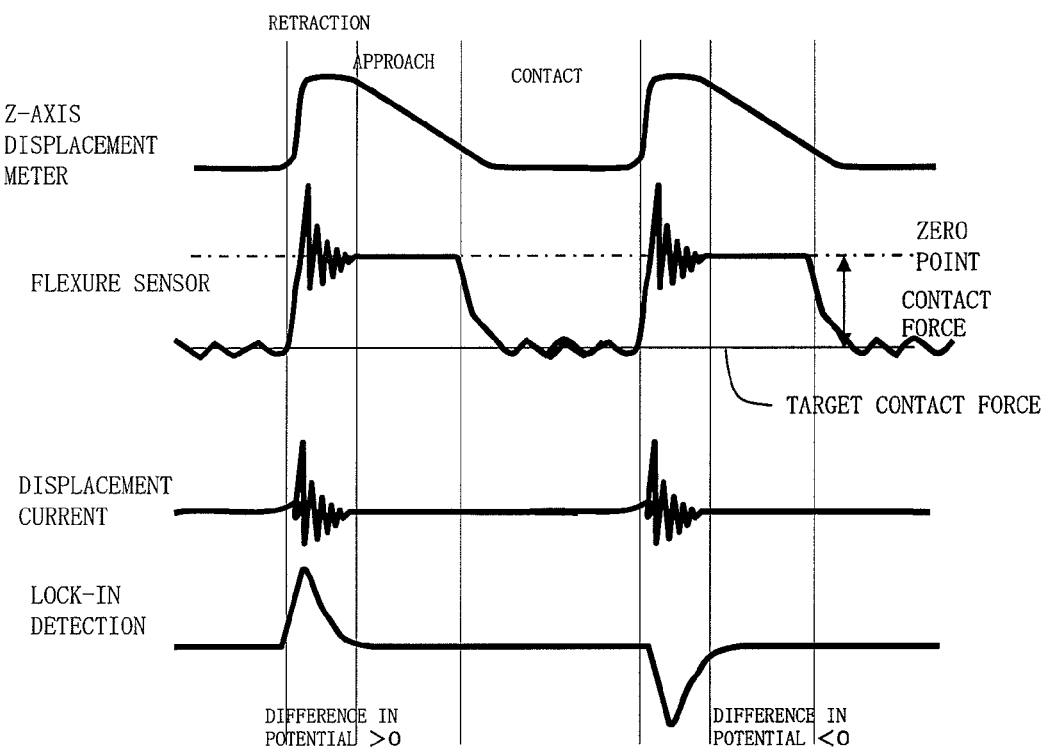
FIG. 14 is a view illustrating signal waveforms of an embodiment by detection of displacement current due to prove (cantilever) vibration of potential adjustment of a sample stage according to the present invention.

FIG. 14 illustrates signals at potential adjustment according to another embodiment of the present invention. The residue vibration appearing at the cantilever 193 appears at an output of the flexure sensor 205 for a while after the probe 103 escapes from adhesion from the sample 501. A displacement current going into/out of the cantilever 193 by this inducement is in synchronization detected with the cantilever flexure signal as a reference. Then, as seen in a signal at the lowest stage in FIG. 14, a signal having a different polarity appears according to the sign of a difference in potential between the probe and the sample. Because the sign of the signal indicates a direction of potential adjustment, a potential of the probe 103 or the sample stage 302 is adjusted using the signal. In FIG. 13, the cantilever 193 is directly vibrated. On the other hand, in FIG. 14, a displacement current is detected using the vibration occurring naturally by the retraction of the probe. As a matter of course, the cantilever 193 may be vibrated by a piezoelectric element, laser illumination or the like during separation of the probe from the sample in place of use of residue vibration.

Moreover, in the two embodiments described using FIGS. 13 and 14, a probe is vibrated to detect a potential adjustment direction. As described using FIGS. 4, 5 and 6, a static flexure direction of the cantilever 193 changes according to conditions of electrostatic charges during a period in which the probe 103 is in no contact with the sample 501. Accordingly, a potential of the probe or the sample stage may be adjusted so as to eliminate this flexure by measuring the direction by an output of the flexure sensor 205.

Figure 15A:
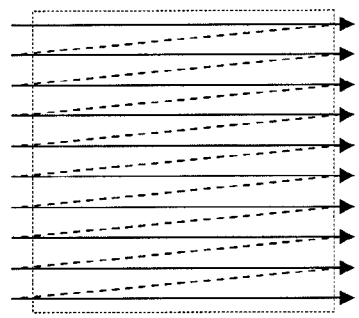
FIG. 15 is a view illustrating examples of concurrent detection results of 3D shape and potential map according to the present invention.
Figure 15B:
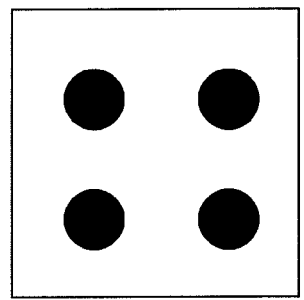
Figure 15C:
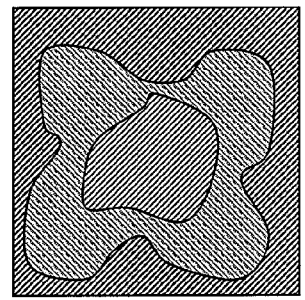

As described above, a height and a potential of the sample can be concurrently measured for each measurement point. Accordingly, as illustrated in FIG. 15A, raster scan is performed, thus providing a 3D shape image and a potential map in a 2D region.

As another embodiment, the following description will be made on a case utilizing a concept that the amplitude, phase and frequency of vibration of a probe 103 change according to a contact condition between the probe 103 and the sample 501. The vibration is performed using a piezoelectric element or laser for vibration, without use of a static flexure of the probe 103, as a system for detecting a contact force between the probe 103 and the sample 501. In this case as well, as illustrated in FIG. 11, potential adjustment is made while the probe is being pulled up after a shape (a height) is measured for each point under a contact between the probe and the sample.

In the embodiment illustrated in FIG. 13, separation of a frequency of vibrating the cantilever for detection of a contact force from a frequency of an AC potential applied for potential adjustment permits detection of a difference in potential in the same way as well as potential adjustment.

In the embodiment illustrated in FIG. 14, a displacement current resulting from vibration of the cantilever is detected. This permits potential adjustment, utilizing vibration of the cantilever, as it is, performed for contact force detection under a non-contact condition.

Fifth Embodiment

The above description has been made on a method for addressing electrostatic charges in measuring a 3D shape of the sample by repeating vertical movement of the probe for each point. On the other hand, in a system for continuously bringing a probe into contact with a sample for scanning, such as contact measurement or dynamic force measurement, a period in which the probe separates from the sample is not in each scanning line, except a system called a non-contact mode by detecting a change in fine vibration by an attraction force between the probe 103 and the sample 501. In this case, it is sufficient to pull up the probe from the sample in a section indicated with dot lines for performing movement between respective scanning lines illustrated in FIG. 15A and make potential adjustment described above in this period.

Figure 16:
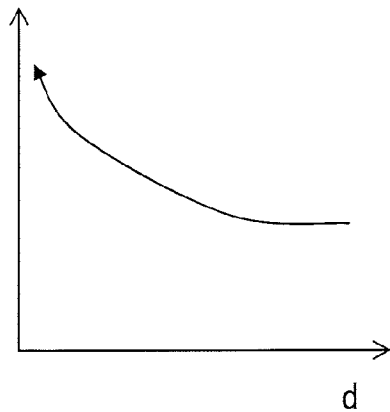
FIG. 16 is a view illustrating examples of field intensity distribution and potential distribution detection results relative to a probe-to-sample distance according to the present invention.
Figure 16:
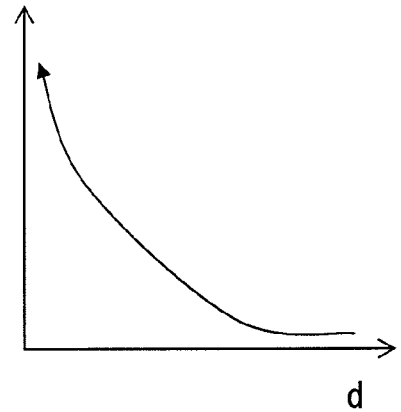

Moreover, the potential adjustment described above may be made during an approach of the sample to the probe before measurement start, that is, until the distance between the sample and the probe from several millimeters to several micrometers to tens of micrometers being the operational distance for the probe traveling mechanism 252 so as to reduce influences of electrostatic charges and, if the electrostatic charges are excessive, an alarm may be issued. Especially, a static flexure of the cantilever 193 is proportional to field intensity. Accordingly, if a change in a flexure amount is recorded during an approach of the probe to the sample, a relationship between an abscissa d and field intensity is obtained, where d is a distance between the probe 193 and the sample 501 as illustrated in FIG. 16. Further, by integrating it, a relationship between d and a potential is also obtained.

Sixth Embodiment

Figure 17A:
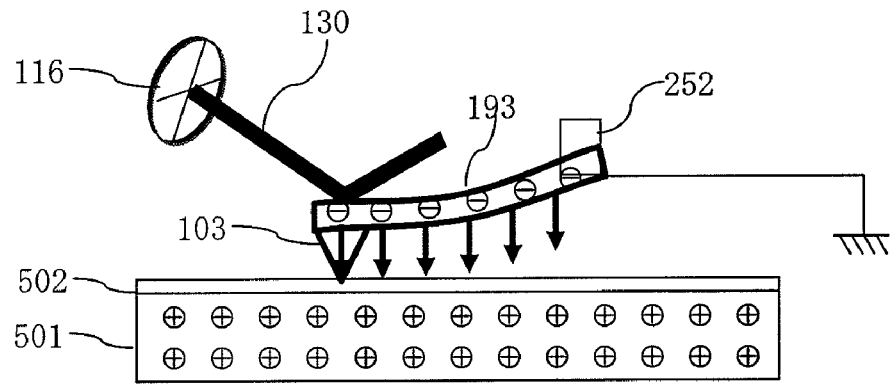
FIG. 17 is a view illustrating an influence of electrostatic charges of a sample during contact mode measurement.

Referring to FIG. 17, problems of electrostatic charges in contact measurement will be described below. In contact measurement, with the probe 103 brought into contact with the sample 501, scanning is performed for a contact force on the sample 501 while a height thereof is being controlled so that a signal of the cantilever flexure sensor 205 is constant. The sample 501 is a conductor, on which thin insulating film 502 is formed. Charges generated on the film 502 by frictional electrification resulting from scanning of the probe 103 are accumulated in the conductor 501 little by little. Then, induced charges by the charges occur in the cantilever 193 and an electrostatic attraction force occurs between the cantilever 193 and the sample 501. In addition to a flexure of the cantilever 193 by a proper contact force between the probe 103 and the sample 501, the cantilever 193 is wholly attracted by a electrostatic attraction force as illustrated in FIG. 17A, so that a downward flexure around the center of the cantilever 193 becomes large. Accordingly, an angle of the light going toward the detector 116 for flexure detection becomes larger than that in a normal state. In other words, the cantilever is apparently pushed into larger than in a normal state. That is, a contact force is recognized to be in a large state, so that feedback control to the probe traveling mechanism 252 allows the root of the cantilever 193 to be shifted higher by an amount corresponding to the recognized large contact force.

Figure 18:
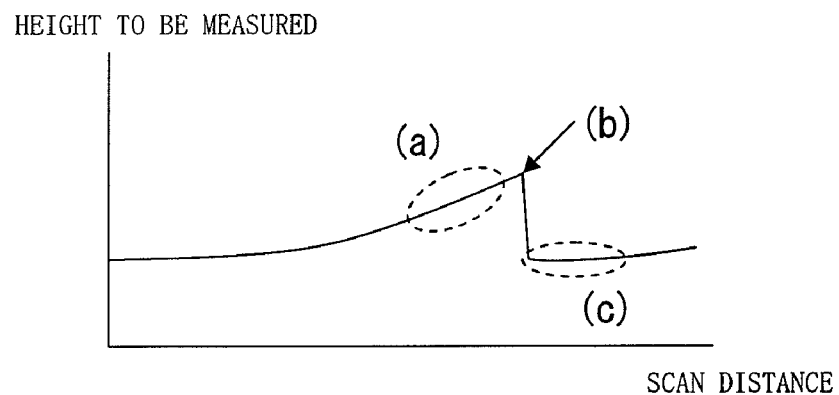
FIG. 18 is a view illustrating a profile to be measured under an influence of electrostatic charges of a sample during contact mode measurement.

FIG. 18 is a view illustrating plotted heights to be measured (that is, heights of the lower portion of a probe fine movement mechanism 252) at this time with a scanning distance taken as abscissa. In addition, a curve of almost the same shape is obtained with time taken an abscissa. A state illustrated in FIG. 17A corresponds to a portion of FIG. 18A, where an apparent height to be measured shifts in a larger direction.

Figure 17B:
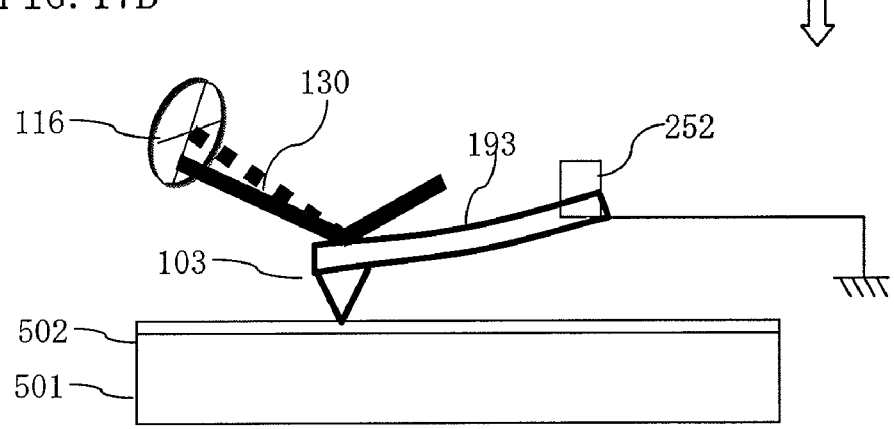
Figure 17C:
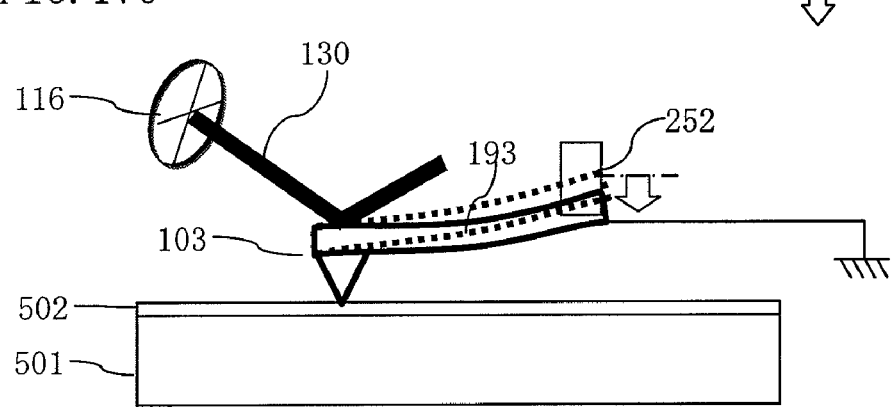

The moment that the probe 103 passes through a thinner portion of the insulating film 502 or a difference in potential between the cantilever 193 and the sample 501 by electrostatic charges exceeds an allowable amount, discharging occurs between the probe 103 and the sample 501, so that electrification charges disappear. Then, as illustrated in FIG. 17B, the electrostatic attraction force bending downward almost in the center of the cantilever 193 disappears, so that an angle of the tip of the cantilever 193 changes and an angle of reflecting light 130 going toward the sensor 116 becomes smaller. That is, the detected contact force becomes smaller. Accordingly, an output of the flexure sensor 205 changes and control for keeping it constant acts, so that the root of the cantilever 193 is pushed down by the probe traveling mechanism 252 as illustrated in FIG. 17C. As a result, as illustrated by (b) to (c) points in FIG. 18, a sawtooth-like step difference appears in a profile of measurement results.

Figure 19A:
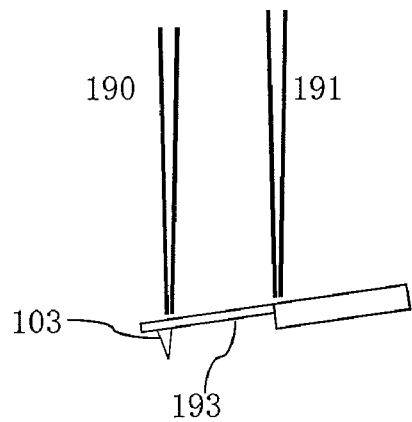
FIG. 19 is a view illustrating examples of measuring flexure amount of a probe without influences of electrostatic charges according to the present invention.
Figure 19B:
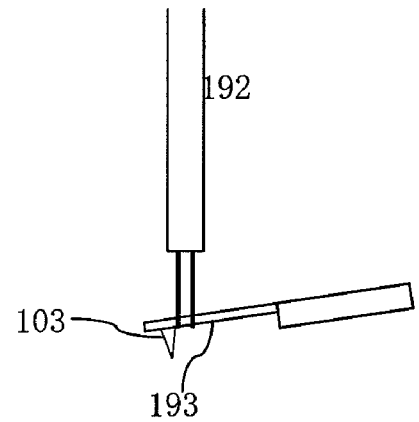

As an embodiment for addressing such states, FIG. 19 will be described below. In FIG. 19A, reference character 190 denotes laser beam irradiated to the tip of the cantilever 193. Reference character 191 denotes laser beam for reference irradiated to the root of the cantilever 103. Interference of the two laser beams permits a height of the tip of the cantilever 193 to be accurately detected based on a height of the root of the cantilever 193 regardless of a flexure shape of the cantilever 193 affected by electrostatic charges. As another system, as illustrated in FIG. 20B, interference of laser beam for measurement irradiated to the cantilever 193 based on laser beam for reference reflected on an end surface of optical fibre 192, permits a height of the tip of the cantilever 193 to be accurately detected based on a height of the end surface of optical fibre regardless of a flexure shape of the cantilever 193 affected by electrostatic charges.

Figure 20:
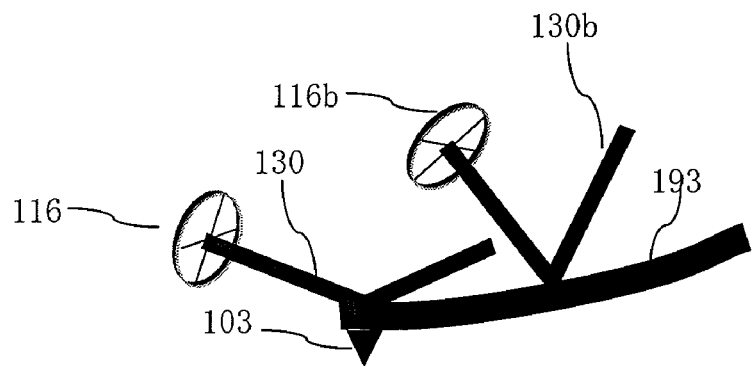
FIG. 20 is a view illustrating an example of detecting an influence of electrostatic charges with the optical lever method according to the present invention.

Referring to FIG. 20, the following description will be made on another embodiment: In addition to laser beam 130 for flexure detection irradiated to the tip of an ordinary cantilever 193, laser beam 130b for inclination detection is irradiated to the central portion of the cantilever and detected by the sensor 116b. Then, the central portion of the cantilever is bowed more inward, which results from electrostatic charges, relative to a flexure shape of the cantilever 193 with a reaction applied to only the probe 103 of the tip under a normal condition, so that a flexure shape of the cantilever 193 becomes different. Also, comparison between outputs of the two sensors 116 and 116b permits detection of dislocation in a deformation state of the cantilever 193. Adjustment of a potential of the cantilever 193 or the sample stage 302 to eliminate this dislocation permits scanning of the probe 103 to be continued with keeping a state in which there are no influences of electrostatic charges.

Finally, referring to FIG. 21, description will be made on an embodiment of a sequence of measurement according to the present invention. First, upon measurement start, probe exchange is performed, a sample is placed on the sample stage and the sample stage is moved under the probe. Next, sample approach is started. At this time, by detecting a flexure state or a vibration state of the cantilever, the sample stage or a potential of the probe is adjusted. If voltage is excessive on the way, this is determined to be large electrostatic charges, and an approach thereof is interrupted, warning is made, an ionizer is operated and a neutralization process, such as bringing a grounded conductor for discharging into contact with the sample, is taken before second measurement. If a voltage is not excessive, potential adjustment and approach are repeated until sample approach is completed.

After completion of sample approach, measurement is started. During scanning for measurement, movement is made to each measurement point, potential adjustment and potential measurement are performed in such a state that a probe separates and it is determined whether or not voltage is excessive, and if excessive, measurement is interrupted, warning is made, an ionizer is operated and a neutralization process, such as bringing a grounded conductor for discharging into contact with the sample, is taken before second measurement. If voltage is not excessive, the probe is brought into contact with the sample to measure a height of each measurement point. The operation is repeated at the each measurement point described above until scanning of the whole measurement range is completed.

Figure 21:
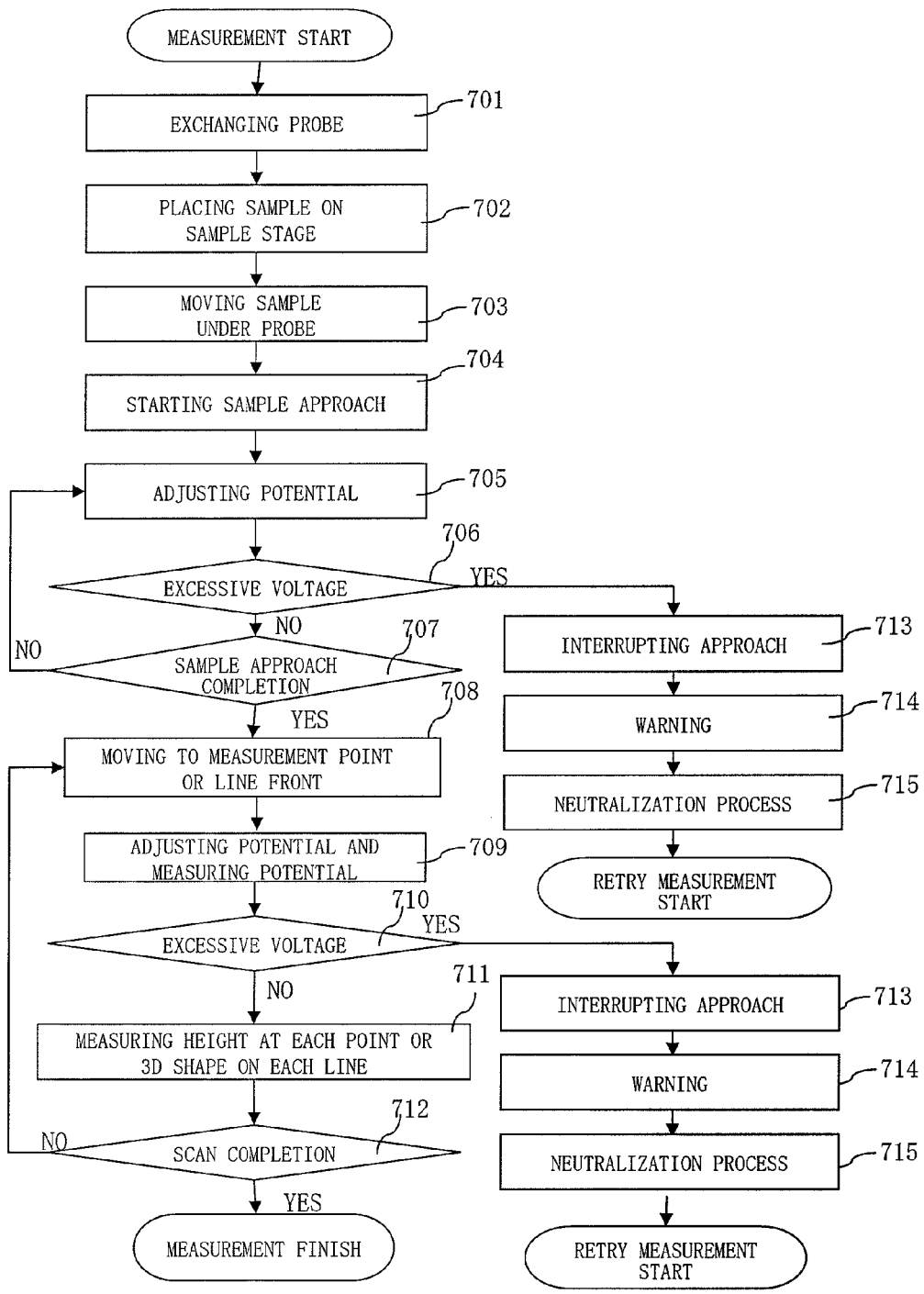
FIG. 21 is a view illustrating an operational sequence of an apparatus during sample measurement according to the present invention.

The above description in FIG. 21 has been made with assumption of a measurement mode for repeating retraction and approach of the probe for each point. In such a mode that measurement is made with a probe and a sample in contact with each other continuously during operation for each line, after movement is made to the front end of each line, potential adjustment and potential measurement are performed under such a condition that the probe separates and it is determined whether or not voltage is excessive, and if excessive, measurement is interrupted, warning is made, an ionizer is operated and a neutralization process, such as bringing a grounded conductor for discharging into contact with the sample, is taken before second measurement. If voltage is not excessive, the probe is brought into contact with the sample for line scanning and a height profile of each line is measured. The above operation at each measurement line is repeated until scanning of the whole measurement range is completed.

AFM measurement can be made without influences of electrostatic charges. This permits measurement as it is without need of previous treatment of samples, such as grounding, neutralization or coating. Accordingly, in the course of production of high-technology devices such as semiconductors and flat panel displays, the sample is measured as it is, thus returning to a production line.

What is claimed is:

1. A scanning probe microscope comprising a drive mechanism capable of accurately controlling a mutual position between a retainer of a cantilever with a probe on a tip thereof and a sample stage for retaining a sample and a sensor capable of measuring a deformation state of the cantilever and being capable of measuring a 3D surface shape of the sample and other surface distributions, wherein:

the scanning probe microscope detects a flexure or a vibrating state of the cantilever due to electrostatic charges in synchronization with scanning of a sample surface during measurement with relative scanning between the probe and the sample; and adjusts a potential of a conductive material brought into contact with the probe, the sample stage or the sample.

2. The scanning probe microscope according to claim 1, wherein the adjustment of the potential of the conductive material made in synchronization with the scanning of the sample surface is in synchronization made within such a period that the probe temporarily separates from the sample to move the probe to a start position of a next measurement line, during measurement with the relative scanning between the probe and the sample.

3. The scanning probe microscope according to claim 1, wherein the adjustment of the potential of the conductive material made in synchronization with the scanning of the sample surface is made, in a mode of separating the probe from the sample once after measurement at each measurement point, moving to an adjacent measurement point under the state, bringing the probe into contact with the sample again and measuring a height of the sample upon a reach to a fixed contact state, at any timing of a period of movement to the adjacent measurement point, upon separation completion and upon an approach by a fixed distance after a second approach starts.

4. The scanning probe microscope according to claim 1, wherein
the adjustment of the potential of the conductive material made in synchronization with the scanning of the sample surface is made in synchronization with a period of measurement with the scanning of the sample while a fixed contact force is being kept between the probe and the sample and by separating an influence of deformation to the cantilever due to an electrostatic force from deformation to the cantilever due to the tip of the probe touching the sample.

5. The scanning probe microscope according to claim 4, wherein
separating an influence of deformation to the cantilever due to an electrostatic force from deformation to the cantilever due to the tip of the probe touching the sample is caused by a dislocation from a standard state of a single of a flexure state of the probe due to the light irradiated almost to the tip of the cantilever and the light irradiated to the middle thereof.

6. The scanning probe microscope according to claim 1, wherein
adjustment of the potential of the conductive material made in synchronization with the scanning of the sample surface is made by detecting an influence of the sample or the probe due to electrostatic charges from a deformation state of the cantilever and, to cancel the influence, performing potential adjustment or, if in excess of a fixed value, issuance of an alarm or neutralization process.

7. The scanning probe microscope according to claim 6, wherein
the deformation state of the cantilever is detected by detection of a direction change of a reflecting light of a light irradiated on the cantilever with a position sensitive device or a divided photodiode mounted at a position where the reflecting light reaches.

8. The scanning probe microscope according to claim 6, wherein the deformation state of the cantilever is detected with an element which produces strain-related signal incorporated into the cantilever.

9. The scanning probe microscope according to claim 1, wherein
the potential adjustment is made by changing a potential of the probe, the sample or the sample stage so that a static deformation amount of the probe becomes zero within a period in which the probe comes into no contact with the sample.

10. The scanning probe microscope according to claim 1, wherein
the potential adjustment is made by detecting a displacement current flowing into the probe by a change in capacitance between the probe and the sample due to vibration of the probe within a period in which the probe comes into no contact with the sample, and by changing a potential of the probe, the sample or the sample stage so that an output obtained at lock-in detection of the signal relative to a signal indicating vibration of the probe becomes zero.

11. The scanning probe microscope according to claim 1, wherein
the potential adjustment is made by detecting a deformation to the probe induced by a superimposed AC voltage relative to a difference in potential of the probe, the sample or the sample stage within a period in which the probe comes into no contact with the sample, and by changing the potential of the probe, the sample or the sample stage so that an output obtained when a signal indicating a deformation to the probe is in synchronization detected relative to an applied voltage becomes zero.

* * * * *